United States Patent [19]

Hoffman et al.

[11] 4,267,953
[45] May 19, 1981

[54] METHOD FOR ALLEVIATING THERMAL STRESS DAMAGE IN LAMINATES

[75] Inventors: Charles A. Hoffman; John W. Weeton, both of Rocky Rivery; Norman W. Orth, Cleveland, all of Ohio

[73] Assignee: The United States of America as represented by the Administrator of the National Aeronautics and Space Administration, Washington, D.C.

[21] Appl. No.: 122,967

[22] Filed: Feb. 20, 1980

Related U.S. Application Data

[62] Division of Ser. No. 893,857, Apr. 6, 1979, Pat. No. 4,211,354.

[51] Int. Cl.³ .............................................. B23K 20/02
[52] U.S. Cl. ..................................... 228/118; 228/190
[58] Field of Search ............... 228/118, 123, 170, 174, 228/185, 190, 178

[56] References Cited

U.S. PATENT DOCUMENTS

| | | | |
|---|---|---|---|
| 2,982,012 | 5/1961 | Wilkins et al. | 228/118 X |
| 3,200,489 | 8/1965 | Keeleric | 228/118 X |
| 3,228,104 | 1/1966 | Emeis | 228/123 X |
| 3,284,176 | 11/1966 | Reed et al. | 228/178 X |
| 4,211,354 | 7/1980 | Hoffman et al. | 228/118 |

*Primary Examiner*—Gil Weidenfeld
*Assistant Examiner*—Kenneth J. Ramsey
*Attorney, Agent, or Firm*—N. T. Musial; J. R. Manning; G. E. Shook

[57] ABSTRACT

A method is provided for alleviating the stress damage in metallic matrix composites, such as laminated sheet or foil composites, wherein non-intersecting discrete discontinuities are positively introduced into the interface between the layers so as to reduce the thermal stress produced by unequal expansion of the materials making up the composite. The discontinuities are preferably produced by drilling holes in the metallic matrix layer. However, a plurality of discrete elements may be used between the layers to carry out this purpose.

3 Claims, 5 Drawing Figures

METHOD FOR ALLEVIATING THERMAL STRESS DAMAGE IN LAMINATES

ORIGIN OF THE INVENTION

The invention described herein has made by employees of the United States Government and may be manufactured or used by or for the Government without the payment of any royalties thereon or therefor.

STATEMENT OF COPENDENCY

This application is a division of application Ser. No. 893,857 which was filed Apr. 6, 1979 and issued as U.S. Pat. No. 4,211,354.

FIELD OF THE INVENTION

The present invention relates to metallic matrix composite materials and, more particularly, to a method for preventing structural failure and the degradation or loss of the associated properties of such materials when the materials are subjected to repeated temperature variations.

BACKGROUND OF THE INVENTION

Metallic matrix composites of the prior art frequently sustain damage when they are exposed to temperature variations. This damage may include the loss or reduction of mechanical properties such as tensile and shear strengths and the degradation of the structural integrity of the composite. Such composites characteristically comprise at least two different materials having different coefficients of thermal expansion. Because of the differences in thermal expansion and contraction that occur upon heating and cooling respectively, internal stresses develop when the composite is subjected to temperature variations which lead to either a loss of the mechanical properties of the composite (e.g., its strength) and/or a deterioration of the composite structure (i.e., the composite simply falls apart). The general problem and an underlying basis for the problem are discussed in more detail hereinbelow.

Two patents which generally deal with the problem of the stress induced in composites of two metals by the differential expansion of the metals when heated are U.S. Pat. Nos. 2,421,891 (Keene et al) and 2,468,206 (Keen et al). In the former patent, the end of the component of the composite having the lesser coefficient of expansion is made to extend beyond the end of the other in order to protect an inside weld fillet. In the latter patent, flanges are provided to confine the expansion of the component having the higher coefficient of expansion and a space is left between the component and the flanges in an attempt to reduce the problems resulting from the differential expansion of the two components upon heating. Other patents of possible interest include U.S. Pat. Nos. 2,891,303 (Stephenson), 2,063,325 (McLeod) and 3,544,706 (Aupoix).

SUMMARY OF THE INVENTION

In accordance with the invention, a method is provided for alleviating the thermal stress problems discussed hereinabove. Broadly speaking, this method comprises introducing non-intersecting discrete discontinuities into the interface between the layers or laminae so as to break up the continuous bond which would ordinarily exist between the layers.

In accordance with a preferred embodiment, the laminates include metallic matrix layers and the discontinuities are introduced into the surfaces of these layers which lie adjacent to the other layers. Advantageously, the discontinuities are produced by drilling holes in the metallic matrix layers. Although the same general effect can be produced by using separate, discrete elements to form the matrix layers, it will be appreciated that the preferred methods are considerably more easy to implement.

Other features and advantages of the invention will be set forth in, or apparent from the detailed description of the preferred embodiments found hereinbelow.

DESCRIPTION OF THE PREFERRED EMBODIMENTS

Figure 1:
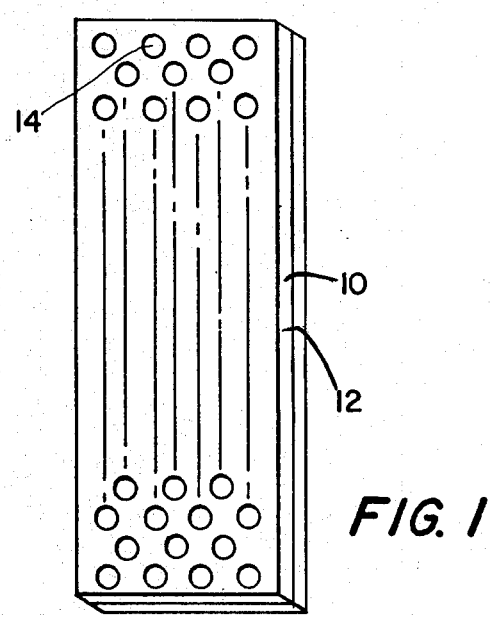
FIG. 1 is a perspective view of a two layer laminate formed in accordance with a first embodiment of the invention.

Although the present invention has a wider application, the invention will be described relative to laminated sheet or foil composites. Such laminated composites are subject to delamination due to shear stress between adjacent layers or laminae. An aspect of the present invention is based on the inventive appreciation that the shorter the laminae that are joined together, the lower the shear stress in the laminae and along the interface. To illustrate the physics of the problem, a simple example will be considered. Thus, assume that a laminate is formed by two laminae A and B which are initially 100 units long before cooling from an elevated temperature. Further, assume that, upon cooling, lamina A contracts ten (10) units and lamina B contracts only one (1) unit, because of differences between the two laminae, so that the difference in length after cooling is nine (9) units. Further, this difference in length will be assumed to be compensated for by shear in lamina A, with lamina A assumed to be a low modulus matrix type of material and lamina B assumed to be a high modulus reinforcement material. Now, consider the case where lamina A and B are initially 10 units long rather than 100 units. After cooling, the laminae will be 9 and 9.9 units in length, respectively, resulting in a difference in length of 0.9 units. Thus, with the same assumptions made above, the shear strains and stresses at the interface of the laminae A and B are about one-tenth of those in the first example, the shear stress at the tip being approximated using the formula $\tau_A = G_A L_A / 2 (\alpha_A - \alpha_B)/t_A$ where $\tau_A$ = the shear stress at the tip, $G_A$ = the shear modulus of lamina A, $L_A$ = initial length of lamina A, $\alpha_A$ and $\alpha_B$ are coefficients of linear thermal expansion of materials A and B, respectively, and $t_A$ = the thickness of lamina A. More generally, the shorter the common length of two bonded laminae having different coefficients of thermal expansion, the lower the shear stress which tends to cause delamination either on cooling or heating. It should be noted that the preceding equation is used merely to indicate that shear stress varies with laminae length and a rigorous mathematical analysis has not been attempted.

As stated hereinabove, the present invention concerns methods by which the effect discussed above is taken advantage of so as to minimize the shear stress. One approach would be to use a discontinuous matrix formed by small discrete elements of matrix material. These elements could be of any shape (square, rectangular, round, etc.) and could be placed contiguously so as to provide a maximum of intervening matrix material or could be slightly separated. Another approach would be to use powders as matrix elements, and these could be pressed between reinforcing sheets. With this technique, the tip shear stress in each discrete element of matrix material would be limited by the length of the element. Except for the powder method, the above approach could, of course, be relatively expensive to implement.

The approach utilized to demonstrate that the shear stress in the matrix can be controlled effectively involves introducing non-intersecting discrete discontinuities into the surface of the matrix, in contrast to providing a discontinuous matrix using separate discrete elements. Thus, referring to FIG. 1, a first embodiment of the invention is illustrated wherein the laminate is formed by laminae 10 and 12 and holes 14 are drilled into the lamina 12 to provide the desired discontinuities. The holes 14 are uniformly distributed and, in an exemplary embodiment, were one-eighth inch in diameter and were spaced apart ⅛ of an inch for a matrix composite 3 inches in length and 1 inch wide.

Figure 2:
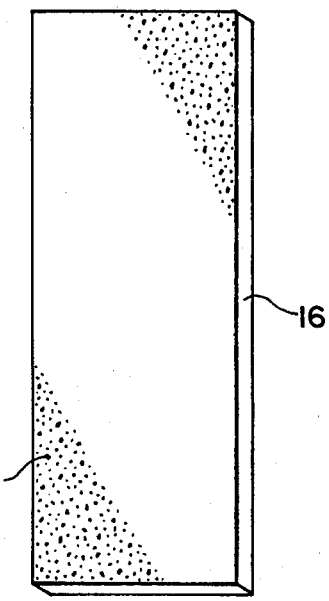
FIG. 2 is a perspective view of a single lamina formed in accordance with a further embodiment of the invention.

Referring to FIG. 2, a second embodiment of the invention is shown wherein a single lamina 16 is shown and wherein the desired discontinuities are introduced by placing inert particles 18 of ceramic or the like on the surface of the matrix lamina. These particles 18 between adjacent layers 20 and 22 in FIG. 4 prevent the formation of a continuous bonding. This controls shear stress which produces both internal unbonding and bending moments which cause external layer peeling as well as internal layer separations. The discontinuities can be produced by a number of different methods.

Figure 3:
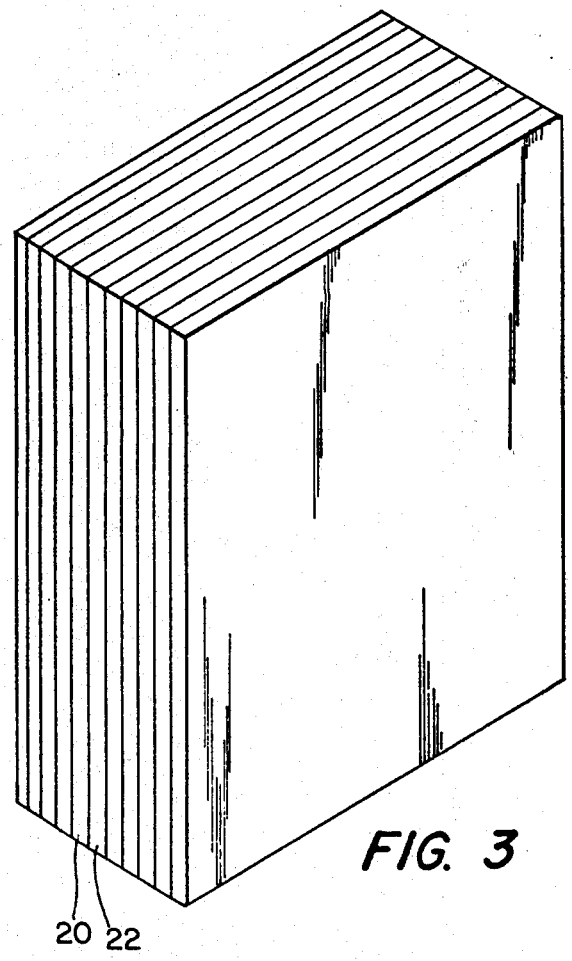
FIG. 3 is a perspective view of a test specimen.
Figure 4:
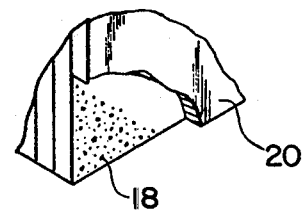
FIGS. 4 and 5 are details of FIG. 3 with portions broken away to illustrate first and second embodiments corresponding to FIGS. 2 and 1, respectively.

Specimens have been prepared such as are illustrated in FIG. 3 employing six laminae of Nichrome sheet (denoted 20 in FIG. 3) and five laminae of tungsten sheet (denoted 22 in FIG. 3), all of the sheets being of 0.02 inch thickness. The individual sheets are formed separately and then bonded together with the tungsten sheets or laminae 22 located between the Nichrome sheets or laminae 20. In separate specimens, particles 18 of ceramic material were randomly placed between the internal Nichrome sheets 20 and the tungsten sheets 22, as indicated in FIG. 4 or drilled as indicated at 22b in FIG. 5, the outer layers being continuous Nichrome sheets, 0.001 inch thick.

It will be appreciated that the thickness shown in the drawings are exaggerated in the drawings and, in fact, in accordance with a further feature of the invention, the outer laminae are made as thin as possible, consistent with a sufficient thickness to properly protect the internal reinforcement laminae in situations where the reinforcement laminae are oxidation prone and the outer matrix laminae are oxidation resistant. The reason for this is that the external matrix laminae having a tendency to peel off because contraction of the outermost matrix laminae produce "through-the-thickness" normal stresses, tending to cause unbonding. It can be shown mathematically that the thicker the external laminae, the greater the normal stresses produced by the shear strain and hence the greater the tendency of the outer laminae to peel off, as well as for internal unbonding to occur.

Turning now to specific tests which have been carried out with respect to the invention, commercially available tungsten and Nichrome were used, with the former material being considered to be the reinforcement and the latter the matrix. The tungsten layers were all nominally 0.051 cm (0.02 in.) thick. The Nichrome laminae used in the interior of all the specimens were also nominally 0.051 cm (0.02 in.) thick; the surface Nichrome laminae were 0.051 cm (0.02 in.) thick in some specimens and were 0.003 cm (0.001 in.) thick in others. The laminae were all nominally 2.54 by 7.62 cm (1×3 in.) in the plane dimension.

The Nichrome and tungsten were alternately layered and generally each composite had six matrix laminae and five reinforcement laminae, as shown in FIG. 3. Hot pressing was done at 981° C. (1800° F.) at a pressure of 13.8 MN/m$^2$ (2200 psi) applied for four hours. The furnace power was then shut off and the specimens allowed to cool of their own accord. The specimens were used as they came from the hot press; that is, the edges were not ground smooth. This was done to expedite production of specimens and to avoid possible bond damage. There was a slight gap between adjacent laminae around the perimeters of the specimens. This was due to a slight compressive deformation around the perimeters of the Nichrome laminae after they had been sheared to size. Visual examination of specimens that had delaminated during testing indicated that there were unbonded zones about 0.07 cm (0.03 in.) wide around the perimeters of the specimens; the remaining interior portions of the laminae appeared to have been well bonded. Furthermore, all metallographic specimens that were viewed indicated that the bonds were satisfactory.

Figure 5:
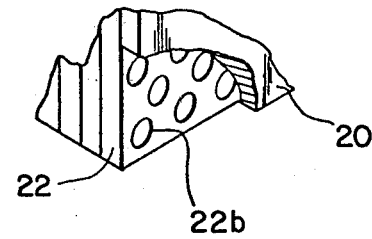

Discontinuities were introduced into some of the matrices by drilling a pattern of 0.476 cm (0.125 in.) diameter holes into these laminae as shown in FIGS. 1 and 5. The hole size and pattern used was arbitrary, although it was desired that a large number of discontinuities be introduced.

A number of specimen types were used. Those having matrices with smooth surfaces were designated as standard; those having matrix surface discontinuities were designated as modified.

Considering the test cycles, one fast cool and two types of slow cool thermal cycle tests were run. The former test would be more representative of what might occur in a practical application. The latter test would tend to permit relaxation to occur and thus reduce stress after cool down; however, they could also introduce relatively more plastic strain, after cool down, than would occur in a fast cool test.

The fast cooled thermally cycled specimens were placed into commercially available thin walled, i.e., 0.0051 cm (0.002 in.), heat treating envelopes which were sealed by folding. A small bit of alumina powder was placed into each envelope to prevent contact of specimens with the envelope. In general, one modified and one standard specimen were run concurrently in the same envelope. The envelopes became embrittled after each cycle and were replaced after each cycle. The specimens were inspected after each thermal cycle.

The fast cool thermal cycle specimens were inserted into a 981° C. (1800° F.) preheated muffle furnace, retained in the furnace for ½ hour and then quenched into a container of water. It was estimated that it took about 10 minutes for the specimens to reach temperature equilibrium at 981° C. (1800° F.). When quenched, all evolution of steam ceased after about two minutes so that the specimens were cooled to 100° C. or less in about two minutes. After each water quench, the specimens were dried under a heat lamp at about 200° C. (900° F.) for ½ hour to completely evaporate any water.

One type of slow cool thermal cycle test was performed in the vacuum hot press (with rams retracted). In general, a modified and a standard specimen were tested concurrently. They were inspected after each cycle. This slow cool cyclic test consisted of heating the specimens to temperature in about two hours, maintaining that temperature for ½ hour, and shutting off furnace power. The specimens remained in the hot press overnight. It is estimated that the specimens cooled to essentially room temperature in about four hours. The specimens were removed and inspected after each thermal cycle.

A second type of slow cool thermal cycle test was performed in air on some specimens. However, with the exception of one standard specimen, oxidation of the tungsten occurred, obscuring the results. The test consisted of heating specimens (in envelopes) in the 981° C. (1800° F.) preheated muffle furnace for ½ hour and removing them from the furnace and placing them on a refractory brick. It took 20 minutes to cool to 60° C. (140° F.). The specimens were inspected after each thermal cycle and then placed into a new envelope for each additional thermal cycle.

The criterion used to determine failure was not a rigorous one. In the instance of the fast cooled standard specimens, the specimens were thermally cycled until they were virtually destroyed by delamination even though they had already begun to delaminate after two or three cycles. An objective was to determine whether delamination was progressive. In the instance of the fast cooled modified specimens, they were initially run for 25 cycles and later for 50 cycles, even though the surface laminae were partially delaminated after several cycles.

A similar rationale was used for continuing the slow cool tests even though delamination was initiated after only several thermal cycles.

The maximum number of cycles applied for either the fast cool or slow cool type of test or for any specimen design was 50.

As a result of the testing discussed above, the "modified" spcimens, i.e., the specimens constructed in accordance with the invention, remained intact after as many as 50 fast cool thermal cycles, (the maximum number) while the standard specimens were essentially destroyed after 21 fast cool cycles, indicating that, in general, the matrix modifications provide significantly improved laminar composite thermal cycle failure resistance.

Considering the test results in more detail, the following major results were obtained from a study of the effects of discontinuities resulting from perforations through or grid patterned grooves on the surface of matrix laminae in laminar composites materials on their resistance of delamination:

(i) The presence of matrix discontinuities improved thermal expansion mismatch resistance in specimens subjected to fast cool thermal cycles. Standard specimens (without matrix discontinuities) began to delaminate after two cycles and were virtually destroyed by delamination in 21 or fewer cycles. Some modified specimens (with matrix discontinuities) withstood 50 cycles, the maximum number applied, with no sign of delamination damage;

(ii) Standard specimens with uniform lamina thickness of 0.051 cm (0.02 in.) delaminated severely in 21 or fewer cycles under both slow cool and fast cool conditions.

(iii) Standard specimens with thin surface laminae of 0.003 cm (0.001 in.) did not delaminate in 50 slow cool thermal cycles but delaminated in 21 or fewer, i.e. as few as two fast cool thermal cycles.

It will be appreciated that the method of the present invention can be employed with laminar composites of two or more constituents (i.e., two or more different materials) and with fiber reinforced composites of two or more constituents. Although the invention has been described relative to exemplary embodiments thereof, it will be understood that other variations and modifications can be effected in these embodiments without departing from the scope and spirit of the invention.

We claim:

1. A method for making metallic composites comprising at least two alternating layers of metals and metal alloys having different coefficients of thermal expansion and defining an interface therebetween, said method comprising
providing a plurality of tungsten reinforcement layers,
providing a plurality of nickel-chromium alloy matrix layers,
positively introducing non-intersecting discrete discontinuities into the alloy matrix layers at said interface in said composite by placing inert particles between said reinforcement layers and said matrix layers at said interface so as to reduce thermal stress produced by the unequal thermal expansion of said alternating layers,
assembling said reinforcement layers and said matrix layers into alternating layers,
hot pressing said assembled reinforcement and matrix layers to form said composites, and
cooling said composites to ambient temperature.

2. A method as claimed in claim 1 wherein said discontinuities are formed by placing inert particles of a ceramic material between said reinforcement layers and said matrix layers at said interface.

3. A method as claimed in claim 1 wherein said inert particles are randomly placed between said reinforcing layers and said matrix layers.

* * * * *